United States Patent [19]

Trussler et al.

[11] 4,322,668
[45] Mar. 30, 1982

[54] POWER CONTROL OF A STALLING MOTOR

[75] Inventors: Ronald C. Trussler; Stanley V. Reiten; William A. Wyeth, all of Peterborough, Canada

[73] Assignee: Canadian General Electric Company Ltd., Toronto, Canada

[21] Appl. No.: 43,076

[22] Filed: May 29, 1979

Related U.S. Application Data

[63] Continuation of Ser. No. 829,394, Aug. 31, 1977, abandoned.

[30] Foreign Application Priority Data

Nov. 12, 1976 [CA] Canada .................................. 265450

[51] Int. Cl.³ .............................................. H02P 5/16
[52] U.S. Cl. .................................... 318/434; 318/432; 318/308; 318/476
[58] Field of Search ............... 318/144, 146, 434, 432, 318/474, 476, 308, 332, 338

[56] References Cited

U.S. PATENT DOCUMENTS

| | | | |
|---|---|---|---|
| 2,494,516 | 1/1950 | Mozzanini et al. | 318/146 |
| 3,379,950 | 4/1968 | Fredline | 318/434 |
| 3,508,132 | 4/1970 | Peterson | 318/308 |
| 3,515,971 | 6/1970 | Joslyn et al. | 318/308 |
| 3,649,895 | 3/1972 | Joslyn | 318/331 |
| 3,671,835 | 6/1972 | McMenamy | 318/308 |
| 3,727,103 | 4/1973 | Finch et al. | |
| 3,914,675 | 10/1975 | Konrad | 318/139 |
| 3,931,557 | 1/1976 | Osburn | 318/434 |
| 3,935,520 | 1/1976 | Johnson | 318/332 |
| 3,999,111 | 12/1976 | Bailey | 318/338 |
| 4,017,775 | 4/1977 | Artrip | 318/139 |
| 4,028,601 | 6/1977 | Peterson | 318/308 |
| 4,066,934 | 1/1978 | Waldorf et al. | 318/332 |
| 4,079,301 | 3/1978 | Johnson | 318/331 |

Primary Examiner—David Smith, Jr.
Attorney, Agent, or Firm—Albert S. Richardson, Jr.

[57] ABSTRACT

A control system, for a motor which may be subjected to stalling loads, provides a non-linear increase in motor current during stalling conditions to maintain rated horsepower. When the maximum transient overload current is reached, this current is maintained to keep the motor torque at a maximum until the motor is stalled. This provides maximum motor torque down to a stalled condition and resists stalling. A limit controller determines the maximum time a particular overload motor current can be maintained and when this time has passed the motor current is reduced to rated current. If the motor should stall completely a further reduction in motor current is made automatically.

10 Claims, 7 Drawing Figures

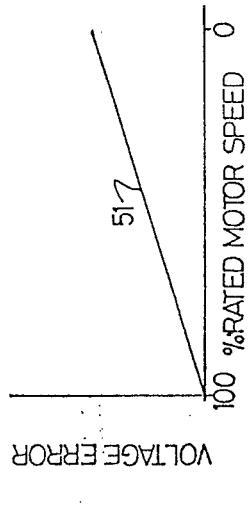
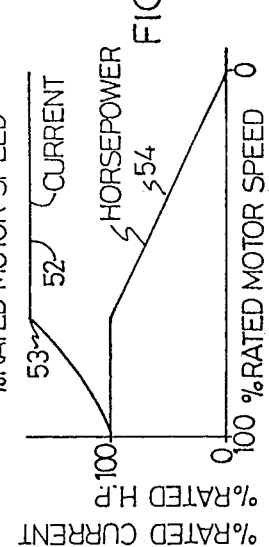
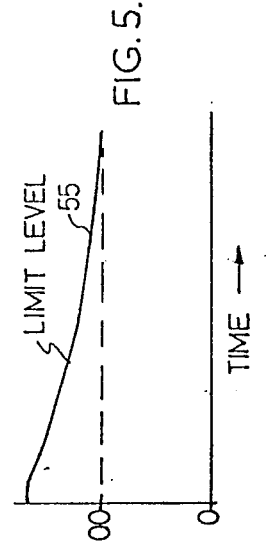
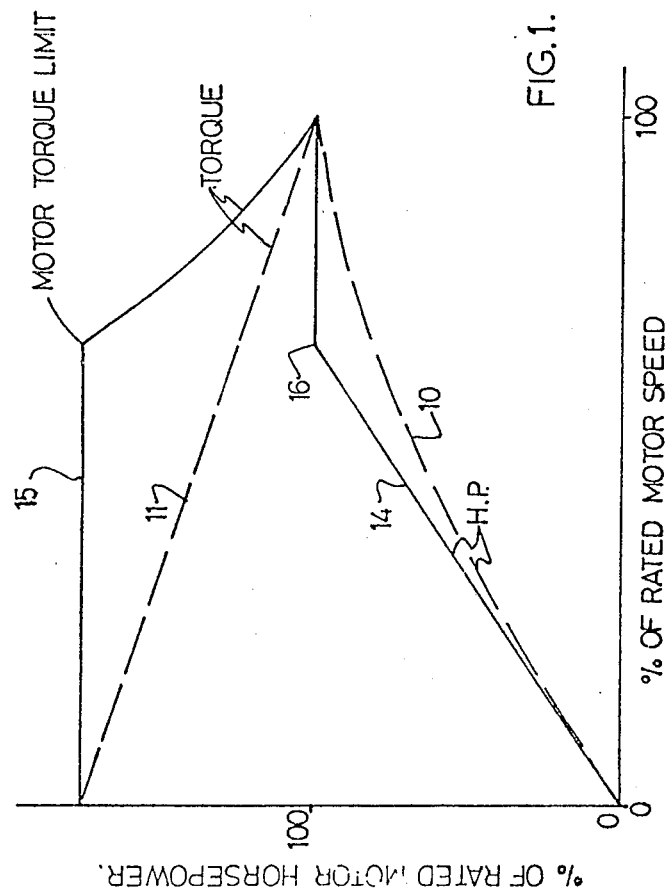

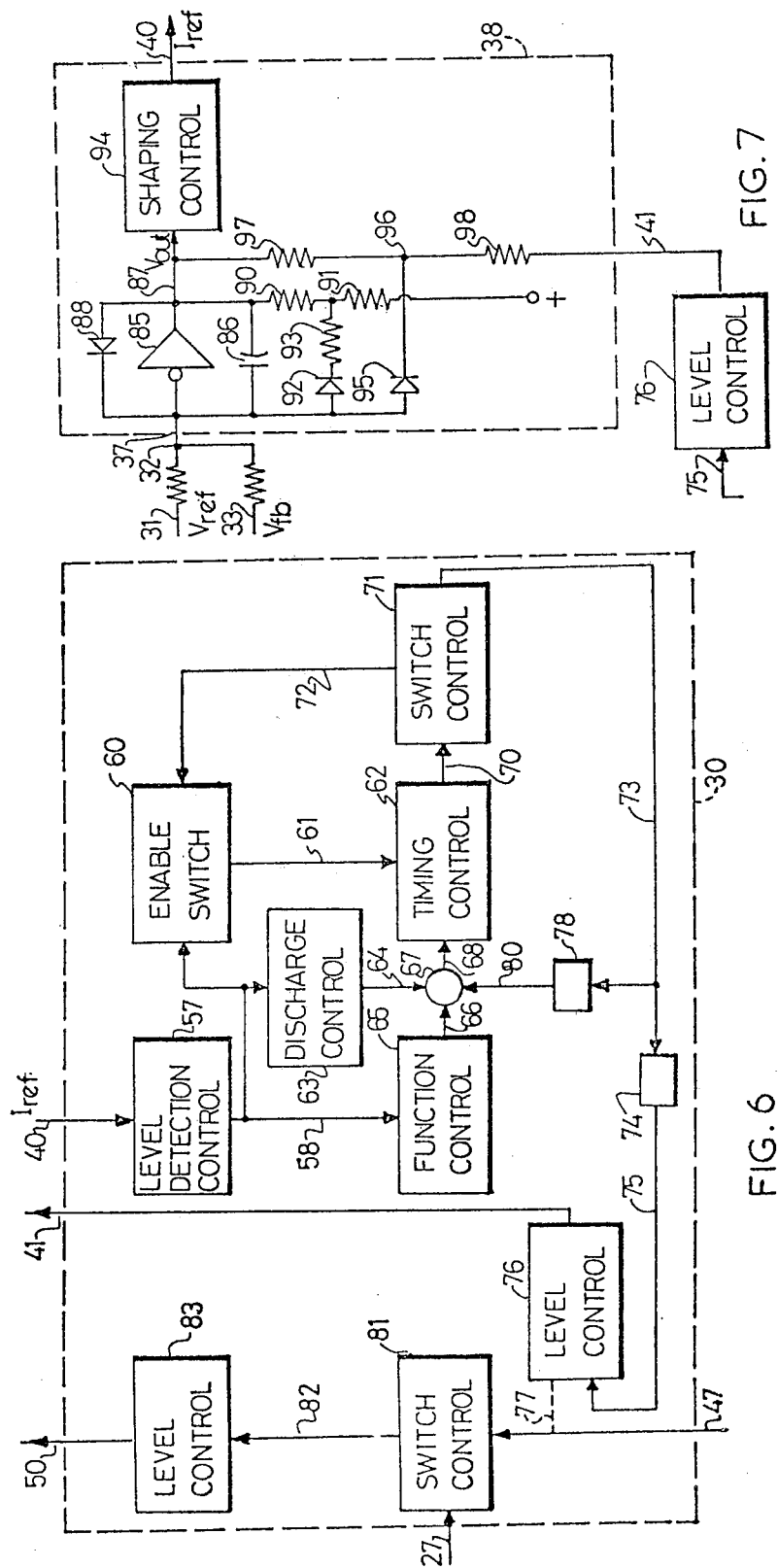

POWER CONTROL OF A STALLING MOTOR

This is a continuation, of application Ser. No. 829,394, filed Aug. 31, 1977, now abandoned.

This invention relates to a control system for a motor which may be subjected to stalling loads.

There are situations in which motors are subjected to stalling loads, that is the motors are subjected to stalling conditions. For example, motors in propulsion drive systems may sometimes be subjected to stalling loads. For a specific example, a motor in a propulsion drive system for an icebreaker may be subjected to a stalling load caused by ice jamming around the propellor or when the ship is backed into ice to "mill" or to grind it.

It the past the manner in which motors were controlled when subjected to a stalling load was not completely satisfactory.

The prior systems and the control system according to the present invention will be described with reference to the accompanying drawings in which:

FIG. 1 is a graph showing percent of rated motor torque and horsepower against percent of rated motor speed for a prior art control system and for a system according to the present invention;

Figure 2:
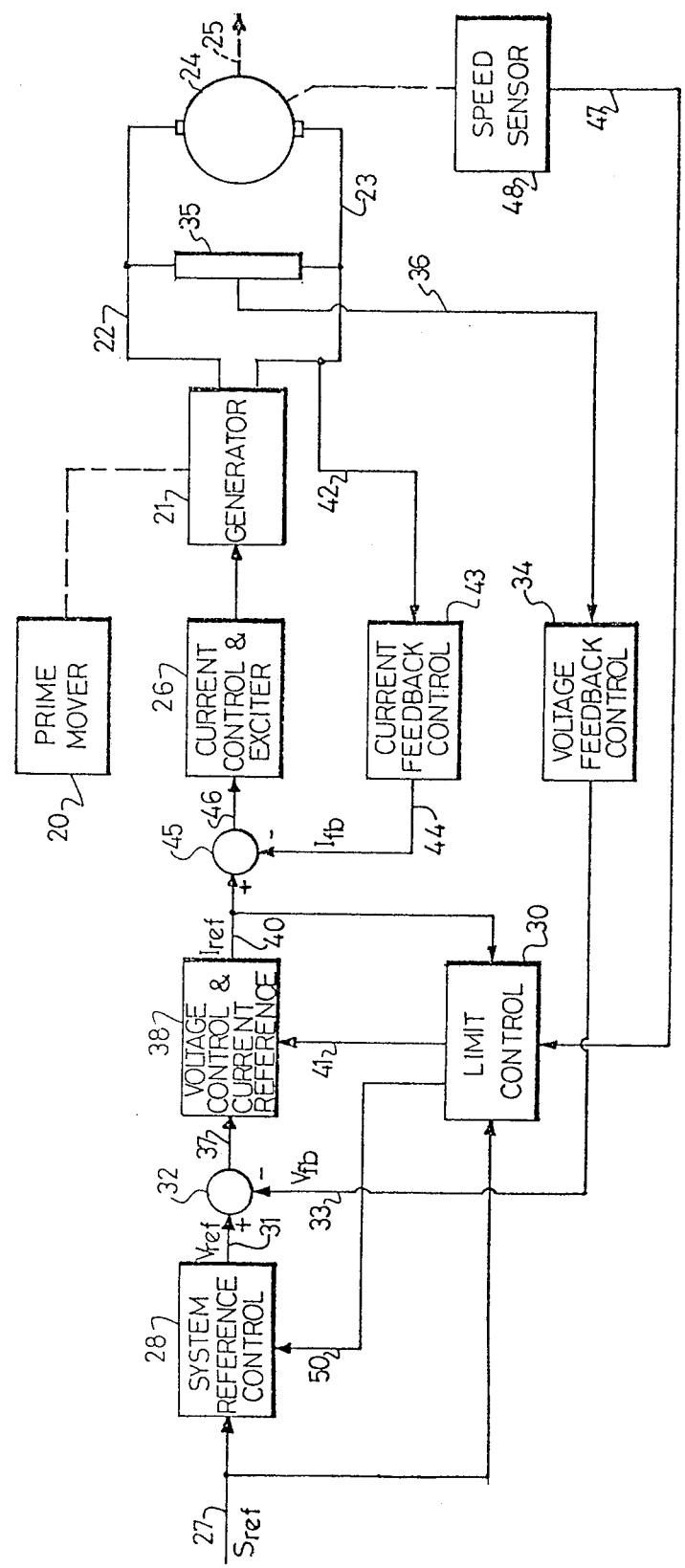
FIG. 2 is a simplified block diagram showing a form of control system according to the present invention.

FIG. 3 (located on the same sheet as FIG. 1) is a graph showing voltage error against percent rated motor speed;

FIG. 4 (located on the same sheet as FIG. 1) is a graph showing percent rated current and percent rated horsepower plotted against percent rated motor speed, FIG. 5 (located on the same sheet as FIG. 1) is a graph showing percent rated motor current for transient overloads plotted against time, FIG. 6 is a simplified block diagram of a limit control suitable for use with the invention, and FIG. 7 is a simplified block diagram of a voltage control and current reference circuit suitable for use with the invention.

Referring to FIG. 1, the graph shows broken lines 10 and 11 which represent respectively percent of rated horsepower and percent of rated motor torque plotted against percent of rated motor speed for a prior art system of motor control. In practice, when a motor is subjected to a stalling load it may either slow down or stall completely due to the load torque being greater than the torque developed by the motor. In the prior art, a typical system of control allowed the current to increase linearly as the motor speed decreased until at stall the current was at the short time overcurrent rating of the motor. If the stall condition lasted for more than a few seconds (for example, of the order of 10 seconds), the load would be reduced to prevent damage to the motor. It will be seen that with this prior art control the power developed by the motor decreases as the motor speed decreases until the motor stalls, and this is shown by broken line 10 in FIG. 1. Also, as the motorspeed decreases, the torque developed by the motor increases linearly to the stall point and this is shown by broken line 11 of FIG. 1.

It will be seen that the available power of the motor is not utilized under conditions where it would be very desirable to develop all the available power, and similarly the available torque is not utilized under conditions when it would be very desirable to utilize it. Increasing the torque available prior to stall will reduce the chance of a stall occurring. In addition, a motor may be able to withstand its short term or transient overload current for perhaps 10 or 15 seconds under a completely stalled condition, but it may withstand this current for a much longer time if the motor is turning.

In the control system of the present invention, when the motor is subjected to a stalling load, the motor is controlled to develop its rated power as the motor speed decreases until the maximum motor current capability is reached. After the maximum motor current capability is reached the maximum developed torque is maintained until the motor stalls. The solid line 14 in FIG. 1 shows the manner in which the developed horsepower decreases as the motor speed decreases. It will be seen that rated horsepower is maintained as speed decreases until point 16 on curve 14, and thereafter the horsepower decreases linearly with speed. Solid line 15 shows the increase in torque as speed decreases below rated speed until the torque limit is reached, and this limit is maintained with any further decrease in speed. The torque limit, and the point 16 to which horsepower can be maintained, correspond to the maximum motor current capability.

Thus, it is a feature of the invention to provide a control system with which it is possible to develop considerably more torque under stalling conditions well before the motor stalls, and this reduces the chances of a stall occurring.

It is, of course, desirable to include a form of protection for the motor so that it will not exceed permissible operating values when the motor is required to produce greater than rated torque for limited periods of time. This is done in the control system of the present invention by integrating the effects of various factors when operating at a torque greater than rated torque to find a time interval based on the integrated values and representing the maximum length of time the operation at the particular values may proceed. When the time interval is reached, the motor current is reduced to a level compatible with motor cooling.

Accordingly, in one form of the invention there is provided a control system for controlling a motor which may be subjected to stalling conditions comprising a motor having a rated current and rated power for continuous operation and a maximum transient overload current limit, a generator connected to said motor to supply electrical power thereto, excitation means connected to said generator for providing controllable excitation to said generator to control generator output, means for determining current greater than rated current in said motor due to a stalling condition, and control means responsive to the determination of current greater than rated current controlling said excitation means to provide a non-linear increase in motor current above rated current to maintain motor power as motor speed decreases in said stalling condition until the motor current reaches said maximum transient overload current and then maintaining said maximum overload current.

In another form of the invention there is provided a control system for controlling a motor having a rated current for continuous operation and a maximum transient overload current limit, a generator connected to said motor to supply electrical power thereto, excitation means connected to said generator for providing controllable excitation thereto to control the generator output, means for providing a first reference signal to said system requiring a predetermined operation of said motor, current reference means responsive to said first signal for determining a current reference for said motor and providing a second signal representing said current reference, sensing means for sensing motor current and providing a third signal representing the sensed current, means receiving said second and third signals and providing a fourth signal representing the difference in said signals and applying said fourth signal to said excitation means for controlling the excitation, means for determining a stalling condition of said motor connected to said current reference means for altering said second signal during stalling conditions to require a non-linear increase in motor current over said rated current to maintain motor power at its rated output as motor speed decreases until the motor current reaches said maximum transient overload current and then maintaining said maximum overload current.

Referring now to FIG. 2, which is a schematic representation of the system, a prime mover 20 is mechanically connected to drive a generator 21. Generator 21 has an output on conductors 22 and 23 which are connected to motor 24 to provide driving current thereto. The motor 24 has a shaft 25 which provides driving power to a load (not shown). A current control and exciter 26, is connected to generator 21 to provide field excitation.

The input to the control system is at 27 and the level of the signal is normally selected by an operator. The signal at 27 represents a system reference signal ($S_{REF}$) and is a desired system level for certain conditions of operation. The signal at 27 is applied to a system reference control 28 where under certain conditions the signal is modified by a signal from a limit control 30 as will be explained hereinafter. The output from system reference control 28 is a voltage reference signal ($V_{REF}$) on conductor 31. The voltage reference signal at 31 is one input to an adder 32, that is to a summing point 32, and the other signal to adder or summing point 32 is on conductor 33. This is a voltage feedback signal ($V_{FB}$) from voltage feedback control 34. A sensor 35 detects the voltage across conductors 22 and 23 (the motor supply voltage) and provides a signal on conductor 36 representing the detected voltage. Conductor 36 is connected to a voltage feedback control 34 which operates as a proportional scaler to provide on conductor 33 a voltage feedback signal modified or scaled in a manner suitable for adder 32. The adder 32 provides an output signal on conductor 37 which represents the difference or error between the voltage reference signal and the voltage feedback signal as is known in that art.

Conductor 37 is connected to circuitry represented by block 38. The circuitry of block 38 is basically a voltage control and current reference circuit as will be described hereinafter. The output is on conductor 40 and represents a current reference signal ($I_{REF}$). In other words, block 38 circuitry provides on conductor 40 a signal which requires a current in motor 24 sufficient to cause the motor to run at a desired voltage (i.e. to have a desired voltage detected or sensed by sensor 35). There is another input to the circuitry of block 38 and this is a signal on conductor 41 from a limit control 30. The limit control 30 provides on conductor 41 a signal which limits or reduces the current required by the current reference in response to excessive time/current conditions as will be explained hereinafter.

Motor current is sensed and a signal representing motor current is on conductor 42. Conductor 42 is connected to a current feedback control 43 which acts as a proportioned scaler to provide on conductor 44 a current feedback signal ($I_{FB}$) modified or scaled in a suitable manner. Conductor 44 and conductor 40 are connected to an adder or summing point 45 to provide a current feedback signal and a current reference signal thereto. The output from adder 45 is on conductor 46 which provides a control signal to current control and exciter 26. Exciter 26 is responsive to this signal to provide a suitable excitation current to the field of generator 21 so that it provides a desired output.

The limit control 30 receives three signals. One signal is the system reference signal at 27, another signal is the current reference signal from conductor 40, and the remaining signal is on conductor 47 and is a signal from speed sensor 48 representing motor speed. The limit control 30 provides control signals on conductors 41 and 50 to voltage control and current reference 38 and system reference control 28, respectively.

The operation of the system will be described under different operating conditions to give a better understanding of the invention.

Under normal conditions the drive motor 24 will have a steady load and will have a given voltage across it and a given armature current. The voltage across the motor will be such that $V_{FB}$ approaches $V_{REF}$ and the armature current will be such that $I_{FB}$ approaches $I_{REF}$. Any fluctuation $V_{FB}$ and $I_{FB}$ will cause the system to re-adjust so that $V_{FB}$ approaches $V_{REF}$ and $I_{FB}$ approaches $I_{REF}$. The motor operates at no more than 100% power and no more than 100% motor speed. The load torque or torque which the load requires and the motor torque will be substantially equal.

Assuming now that the motor is operating at 100% speed and at rated armature current giving 100% of rated power, and conditions change such that the load increases rapidly and the motor begins to stall. The voltage across the motor will decrease causing the voltage feedback signal $V_{FB}$ to decrease. This will cause an increase in the difference between $V_{REF}$ and $V_{FB}$ and this voltage difference or error signal on conductor 37 will increase. The curve 51 in FIG. 3 shows the relationship between voltage difference or voltage error plotted against percent rated motor speed. In FIG. 3 the percent rated motor speed is shown, for convenience, as decreasing to the right and this is opposite to the manner in which it is shown in FIG. 1. The voltage error signal is applied to voltage control and current reference circuitry of block 38. Thus as the motor speed decreases the signal on conductor 37 applied to the circuitry of block 38 increases to increase $I_{REF}$ on conductor 40 to require more motor current to resist stalling. If the circuitry of block 38 responds linearly (as in the prior art) when it calls for a motor current above rated current and so that the horsepower is not exceeded, then in fact the motor horsepower will fall below rated horsepower (see prior art horsepower curve 10 in FIG. 1) and the motor torque will increase linearly to a maximum at zero speed (see prior art torque curve 11 in FIG. 1.) Therefore, the circuitry of block 38 is non-linear for currents above rated current. That is, the circuitry of block 38 is designed so that above rated motor current the output is a non-linear function of the voltage error input signal which increases proportionately to the difference between actual and rated motor speeds (see FIG. 3). The relationship between percent rated motor current and percent of rated motor speed are shown by curve 52 in FIG. 4. When the maximum transient or short term current of the motor is reached (at point 53 in FIG. 4) the current remains constant as this is an absolute limit. The relationship between the voltage error signal and motor current is selected to maintain the product of motor volts times motor current constant up to the maximum transient motor current. As motor volts times motor current is proportional to horsepower, this will maintain horsepower constant as speed decreases. This is shown by curve 54 in FIG. 4 and it will be seen that horsepower is constant up to the point where maximum transient motor current is reached and then it decreases until the motor stalls.

If the prime mover is capable of developing more than rated power, it may be desirable to use a motor which can exceed rated horsepower for predetermined periods. The circuitry of block 38 could of course be adapted to provide other relationships between current and motor speed (i.e. relationship represented by different curves).

It is important to resist stalling as long as possible. When a motor is completely stalled the maximum transient or short term current may only be tolerated for a short time, typically for example, 10 to 15 seconds. However, if a motor is still turning this maximum transient current may be tolerated for a much longer time, perhaps for several minutes. Thus, there is a considerable advantage in resisting or delaying the stall by making a maximum torque available as long as possible.

Up to this point the operation of limit control 30 has not been described. This control determines the length of time an overcurrent can be carried. The length of time an overcurrent can be carried is a function of several factors which include motor current, time and motor speed. The limit control 30 has inputs representing system reference ($S_{REF}$), motor speed, and current reference ($I_{REF}$) as was previously mentioned. It has outputs applied to system reference control and voltage reference control. Control 30 is one arrangement for controlling the duration of transient or short term overcurrents. In a more complex system other arrangements could be provided.

In a stalling condition, but with the motor turning, the limit control 30 integrates the current reference signal $I_{REF}$ on conductor 40 and determines a first time interval. The determination of the time interval may be based on a relationship represented by curve 55 of FIG. 5. Curve 55 represents an inverse time relationship suitable for control 38. If the first time interval is exceeded, then limit control 30 provides a signal on conductor 41 which causes the circuitry of block 38 to decrease the current reference signal $I_{REF}$ on conductor 40. For example, when the first time interval is exceeded, limit control 30 provides a clamping signal on conductor 40 which causes current reference signal $I_{REF}$ to limit motor current to its rated value. The current reference signal remains in this clamped condition for a predetermined time period based on the recovery characteristics of the motor. At the end of the predetermined time the clamping signal is removed and the motor current may rise again above its rated value if it is necessary. As an alterative, the actual current signal $I_{FB}$ on conductor 44 could be used instead of $I_{REF}$ on conductor 40. Now, if the motor 24 should become completely stalled, limit control 30 senses this from the speed signal on conductor 47 and the system reference signal $S_{REF}$ at 27 and it provides after a second time interval a second clamping signal on conductor 50. The second clamping signal causes the system reference control 28 to reduce the voltage reference signal $V_{REF}$ on conductor 31 to an acceptable stall value. It may reduce the signal to zero thus shutting the system down. When the stalled condition ceases and the motor has not been shut down, limit control 30 removes the second clamping signal from conductor 50 and normal operation of the system reference takes place. The first clamping signal may or may not be controlling the motor when the second clamping signal is removed, depending on the overload conditions.

Referring now to FIG. 6 there is shown a block schematic of a circuit suitable for limit control 30 of FIG. 2. The conductors 27, 40 and 47 carry the incoming signals and the conductors 41 and 50 carry the output signals, as in FIG. 2. The level of the current signal $I_{REF}$ on conductor 40 is measured in level detection circuit 57. The level detection circuit 57 provides an output at 58 which represents the current reference above the rated current value. That is, it represents the amount by which the reference exceeds the rated current. The output at 58 is used for three control actions. The output at 58 is applied to an enable switch 60 to provide one of these control actions. When the current reference is above rated current value (i.e. indicating a stalling condition), the signal at 58 turns on an enable switch 60 which then provides an output on conductor 61 causing timing control 62 to operate. The output at 58 is also applied to discharge control 63 where it provides another control action by switching off discharge control 63 so there is no output on conductor 64. The output at 58 is also applied to function control 65 for the third control action. The function control 65 provides an output signal on conductor 66 which is scaled in a predetermined manner to the overload signal at 58.

For the moment assume that all other signals at adder 67 or summing point 67 are zero, that is, assume the signal on conductor 66 is the only signal, then this signal is applied via conductor 68 to timing control 62. The output from timing control 62, which is on line or conductor 70, is proportional to the value or size of the input signal on conductor 68 and to the length of time the signal has been applied. Conductor 70 is connected to a switch control 71 and when the signal on conductor 70 reaches a predetermined level the switch control 71 operates and it then remains in its operated or actuated condition until the signal level on line 70 is reduced to zero. When the signal level on line 70 is reduced to zero the switch control 71 returns to its initial or unactuated condition. Thus, for a particular motor overload there will be on conductor 66 and 68 a signal which is proportional to overload, and the output of timing control 62 will be a signal proportional to overload and to the time the overload condition exists. When the level of the output from timing control 62 reaches a predetermined level (the level is determined from the motor transient or short term overload capability) the switch control 71 operates. For a given overload there will be a related time period which elapses before switch control 71 operates. This is the first time interval which was previously mentioned. Adjustment of the function control 65 will adopt the timing to different motors or different conditions as required.

Now assuming that a transient overload has caused switch control 71 to operate, there will be an output signal on conductor 72 which will cause enable switch 60 to remain in its enabled condition irrespective of the signal at 58. There will also be an output signal on conductor 73 which may be scaled if required by scaler 74 and applied via conductor 75 to level control 76. The level control 76 then provides an output on conductor 41 for voltage control and current reference 38 (FIG. 2) to cause a current reference signal $I_{REF}$ equivalent to rated motor current as was previously explained. Thus the motor current reference level is reduced from an overload value to its rated value and in turn the motor current is reduced by the action of the current control 26 (FIG. 2) from an overload value to a predetermined lower value necessary for cooling.

If the overcurrent capability of the motor is a function of motor speed, then this factor can be introduced by applying the motor speed signal on conductor 47 to the level control 76. This is indicated in FIG. 6 by a broken line 77.

Assumming that the limit control 30 has responded to an overload condition to provide a signal on conductor 41 to reduce the current reference signal to its rated value, then the level detection control 57 will detect no overload and the output at 58 will be zero. The output of function control 65 on conductor 66 will also be zero. The output signal from switch control 71 is applied over conductor 73 to a scaler 78 and the scaled output is then applied over conductor 80 to adder or summing point 67. The polarity of the signal on conductor 80 is such that it reduces the level of timing control 62 or tends to discharge it. Also, as there is no output at 58, discharge control 63 is no longer switched off. As was previously mentioned, when control 63 is switched off there is no output on conductor 64, however when it is switched on it has a predetermined signal level which it provides on conductor 64 to adder 67. The signal is of a polarity which reduces the level of timing control 62. Thus, there is a zero signal on conductor 66 and signals on both conductors 64 and 80 which are additive to provide on conductor 68 a signal tending to reduce at a predetermined rate the level of timing control 62 or tending to discharge control 62 at a predetermined rate. When the timing control 62 is reduced to zero, that is when the output of timing control 62 on conductor 70 is reduced to zero, switch control 71 switches to its original state and this, in turn, switches the signals on conductors 72 and 73 to their initial or normal state (normally zero). When the signal on conductor 72 is zero it does not hold enable switch 60 in its enabled state and switch 60 then assumes a condition in accordance with the signal at 58. When the signal on conductor 73 is zero, then the signal on conductor 80 and 75 is zero. And when the signal on conductor 75 is zero the level control 76 removes the clamping signal from conductor 41 so that the voltage control and current reference 38 (FIG. 2) is not clamped or limited and resumes normal operation. If the signal on conductor 37 (FIG. 2) is still large enough to call for a current reference above rated value, it can do so and the cycle will repeat. However if the stalling condition is removed the voltage control and current reference 38 (FIG. 2) will call for sufficient current to attain the required voltage.

Still referring to FIG. 6, assume that the motor is completely stalled, there will be a signal on conductor 47 representing zero motor speed and a signal on conductor 27 indicating that the system control is not calling for zero speed. These signals are sensed by switch control 81 and when the completely stalled condition is determined and when it exists for a predetermined time interval switch control 81 provides a signal on conductor 82 which is applied to level control 83. The time interval which passes following the completely stalled condition until control 81 provides a signal on conducter 82 is the second time interval that was previously mentioned. When level control 83 receives the signal on conductor 82 it provides a clamping signal on conductor 50. This clamping signal on conductor 50 is applied to system reference control 28 (FIG. 2) causing it to call for zero voltage and thus for zero current. The clamping signal will remain until the system reference signal $S_{REF}$ on conductor 27 is reduced to zero and then the switch control 81 will reset. As the system reference is zero when control 81 resets the voltage reference $V_{REF}$ will, of course, be zero and the motor will remain stationary. The system reference signal can now be raised and if the motor is still completely stalled the cycle will repeat.

Referring now to FIG. 7, there is shown one circuit suitable for the voltage control and current reference 38 of FIG. 2. There is an input at 37 which comes from summing point 32. The signal on conductor 37 thus represents the sum of the signals on conductors 31 and 33 as was previously desired. There is another input on conductor 41 which is the output of limit control 30 (i.e. from level control 76 of FIG. 6). The output from the circuitry of block 38 is on conductor 40.

Under normal operating conditions, that is at or below rated motor current, the voltage feedback signal $V_{FB}$ on conductor 33 will be substantially equal to the voltage reference signal $V_{REF}$ on conductor 31. The signal on conductor 37, representing the difference will be low and an output will be provided on conductor 40 sufficient to provide the required current. The signal on conductor 37 is applied to operational amplifier 85 which acts as an integrator because of capacitor 86. When the conditions are normal and the signal on conductor 37 is low, only a unidirectional output $V_{OUT}$ is required on conductor 87 and diode 88 prevents $V_{OUT}$ from going positive. Resistors 90 and 91 are selected so that diode 92 does not conduct until $V_{OUT}$ on conductor 87 reaches a level equivalent to a current reference $I_{REF}$, corresponding to rated motor current. The signal $V_{OUT}$ is applied to a shaping control 94 which behaves linearly for signals $V_{OUT}$ on conductor 87 when these signals are no greater than the equivalent of a current reference corresponding to rated current.

A diode 95 is connected between the input to operational amplifier 85 and the junction point 96 between resistors 97 and 98 which are series connected between conductor 87 and input conductor 41. The output from level control 76 (see also FIG. 6) is such that diode 95 will not conduct until $V_{OUT}$ on conductor 87 reaches a level equivalent to the maximum transient or short term overcurrent level of the motor. For example, if resistors 97 and 98 were equal then $V_{OUT}$ could rise to a level approximately equal, but of opposite polarity, to the voltage level of conductor 41 before diode 95 would conduct. Thus the current reference signal $I_{REF}$ at 40 can rise as high as the maximum transient overcurrent level for a first time interval as was previously described.

Assume now that the signal at conductor 37 has risen to a level requiring more than rated current (that is, the beginning of a stalling condition). It will be recalled that resistors 90 and 91 are scaled so that diode 92 does not conduct until the signal $V_{OUT}$ on conductor 87 exceeds a level equivalent to rated motor current. As this level has been exceeded, diode 92 conducts placing resistance 93 in parallel with capacitor 86. Amplifier 85 no longer behaves as an integrator but rather has a proportional characteristic. The shaping control 94, which also behaves linearly for values of $V_{OUT}$ below rated current now behaves in a non-linear manner to give the required constant horsepower.

If it now becomes necessary to clamp or limit the signal on conductor 40 (i.e. to clamp $I_{REF}$), the output signal from level control 76 on conductor 41 will be reduced. This will cause diode 95 to conduct for a lower level of signal $V_{OUT}$ on conductor 87. Thus by varying the signal on conductor 41 the maximum output of amplifier 85 can be limited and hence the current reference $I_{REF}$ at 40 can be limited. It is, of course, possible to incorporate into level control 76 a circuit which gives a ramping action to make a smooth transition when the level is changed.

Thus, the circuitry of block 38 provides a linear response when less than rated motor current is involved, it provides a non-linear response when a short term transient over-current is involved to provide the required constant horsepower to a maximum transient over-current level from being exceeded, and it controls the current level initiated by overload conditions in accordance with the signal on conductor 41 from level control 76.

It is believed the operation of the system according to the invention will be clear from the preceding description and particularly from the description of the operation of examples of suitable circuitry. It will be apparent to those skilled in the art that other circuitry could be used. For example, the generator 21 could be either a d-c generator or an a-c alternator whose output is suitably rectified, or the prime mover, generator and exciter could be replaced by a known controllable static power supply such as a battery and chopper combination. The phrase "controllable source of electrical power" in the concluding claims is therefore intended to apply to any one of such equivalent implementations.

What we claim as new and desire to secure by Letters Patent of the United States is:

1. A control system for controlling a motor which may be subjected to stalling conditions, comprising
    a motor having a rated current for continuous operation and a maximum transient overload current limit,
    a controllable source of electrical power connected to said motor,
    reference means for determining a current reference for said motor and providing a first signal representing said current reference,
    sensing means for sensing motor current and providing a second signal representing the sensed current,
    means for receiving said first and second signals and providing a control signal representing their difference,
    control means connected to said power source and responsive to said control signal for determining the output of the source, and
    means for detecting a stalling condition of said motor connected to said reference means for altering said first signal during stalling conditions to require a controlled non-linear increase in motor current over said rated current to maintain motor power at its rated output as motor speed decreases until the motor current reaches said maximum transient overload current and then maintaining said maximum overload current.

2. A control system as defined in claim 1 and further comprising
    limit control means connected to said reference means for providing a third signal when a stalling condition has continued for longer than a first time interval that is inversely related to the amount by which said first signal exceeds rated current, and including level control means responsive to said third signal for clamping said first signal to a level corresponding to a predetermined lower value of current required for cooling.

3. A control system as defined in claim 2 in which said limit control means includes switch control means for detecting a fully stalled condition of said motor and responsive to the start of a fully stalled condition for determining a second time interval representing a maximum time interval said maximum overload current can be maintained in a fully stalled condition and at the end of said second time interval providing a fourth signal, and including means responsive to said fourth signal for limiting said first signal to a level corresponding to a motor current that can be maintained in a fully stalled condition.

4. A control system as defined in claim 3 in which said reference means includes means for providing a system reference signal requiring a predetermined operation of said motor, and further comprising
    a motor speed sensor providing a fifth signal representing motor speed,
    said switch control means being connected to said speed sensor and being responsive to said fifth signal and to said system reference signal to detect said fully stalled condition.

5. A control system as defined in claim 3 in which said second time interval is a fixed predetermined time interval.

6. A control system for controlling a motor which may be subjected to stalling condition, comprising
    a motor having a rated current and power for continuous operation and a maximum transient overload current limit,
    a generator connected to said motor to supply electrical power thereto,
    excitation means connected to said generator for providing controllable excitation thereto to control the generator output and thereby control the motor,
    a system reference control for receiving a first signal representing a required operation of said motor and providing a second signal derived from said first signal and representing a desired motor voltage,
    a voltage sensor connected to said motor for sensing the voltage across said motor and providing a third signal representing the sensed voltage,
    means receiving said second and third signals and providing a fourth signal representing the difference,
    voltage control and current reference means receiving said fourth signal and providing a fifth signal derived from said fourth signal and representing a desired motor current,
    a current sensor connected to said motor for sensing the motor current and providing a sixth signal representing the sensed current,
    means receiving said fifth and sixth signals and providing a seventh signal representing the difference,
    means responsive to said seventh signal controlling said excitation means in accordance with said seventh signal, said voltage control and current reference means providing a linear relationship between said fourth and fifth signals when said motor is operating at less than rated current and providing a non-linear relationship when said motor is operating at more than rated current to maintain rated power as the motor speed decreases until the motor current reaches said maximum transient overload current.

7. A control system as defined in claim 6 and further including a limit control means connected with said voltage control and current reference means to receive said fifth signal therefrom and comprising a level detection control to detect a level of said fifth signal in excess of a level corresponding to rated current and to provide an eighth signal proportional to said excess, timing control means integrating from a reference level said eighth signal and providing a ninth signal when a predetermined level is reached representing a maximum condition of said motor at that current, the interval of integration defining a first time interval, level control means receiving said ninth signal and applying it to said voltage control and current reference means to clamp said fifth signal at a level corresponding to said current value for cooling.

8. A control system as sefined in claim 7 and further comprising a discharge control means in said limit control means responsive to said eighth signal representing a condition of no excess over said rated current for reversing said timing control means to reduce the level therein and when said level is reduced to said reference level to alter said ninth signal so that said fifth signal is no longer clamped.

9. A control system as defined in either of claim 7 or 8 and further comprising a motor speed sensor for sensing the speed of said motor and providing a tenth signal representing the sensed speed, a switch control means in said limit control means for receiving said first and tenth signals and determining therefrom a fully stalled condition of said motor and responsive to the start of said fully stalled condition determining a second time interval representing a maximum time interval said maximum transient overload current can be maintained in a fully stalled condition, said switch control means providing at the end of said second time interval an eleventh signal, and means applying said eleventh signal to said system reference control to limit said second signal to a level corresponding to a motor voltage and current that can be maintained in a fully stalled condition.

10. A control system for controlling a motor which may be subjected to stalling conditions, comprising a motor having a rated current and rated power for continuous operation at a rated speed and having a maximum transient overload current limit, a controllable source of electrical power connected to said motor, reference means for determining a desired magnitude of motor current, said reference means including means effective when the motor is subjected to a stalling load and the speed of the motor is consequently decreasing below said rated speed for increasing the desired magnitude of motor current above said rated current as a non-linear function of the difference between the actual motor speed and the rated motor speed until said desired current magnitude reaches said maximum transient overload limit whereupon said desired current magnitude is maintained at said maximum limit, and control means responsive to the desired magnitude of current for controlling said power source, said control means being effective during a stalling condition of the motor to cause said power source to provide increasing current to the motor so as to maintain rated motor power as motor speed decreases until the motor current reaches said maximum transient overload current limit and then to provide maximum overload current.

* * * * *

UNITED STATES PATENT AND TRADEMARK OFFICE
CERTIFICATE OF CORRECTION

PATENT NO. : 4,322,668

DATED : Mar. 30, 1982

INVENTOR(S) : R.C. Trussler, S.V. Reiten, W.A. Wyeth

It is certified that error appears in the above-identified patent and that said Letters Patent are hereby corrected as shown below:

Column 11, line 8, after "current" insert -- and then maintaining motor current at said maximum overload current. --

Signed and Sealed this

Twenty-seventh Day of July 1982

[SEAL]

Attest:

Attesting Officer

GERALD J. MOSSINGHOFF

*Commissioner of Patents and Trademarks*